United States Patent [19]

Flood

[11] Patent Number: 4,560,427
[45] Date of Patent: Dec. 24, 1985

[54] ULTRASONIC SEAL AND CUT METHOD AND APPARATUS

[75] Inventor: Gary N. Flood, Oxford, Conn.

[73] Assignee: Branson Ultrasonics Corporation, Danbury, Conn.

[21] Appl. No.: 677,605

[22] Filed: Dec. 3, 1984

[51] Int. Cl.$^4$ .................. B29C 27/08; B32B 31/18
[52] U.S. Cl. ................... 156/73.3; 156/88; 156/250; 156/251; 156/267; 156/510; 156/515; 156/580.1; 156/580.2
[58] Field of Search .............. 156/73.1, 73.2, 73.3, 156/88, 176, 267, 251, 309.6, 436, 515, 580.1, 580.2, 510, 250

[56] References Cited

U.S. PATENT DOCUMENTS

| | | | |
|---|---|---|---|
| 567,948 | 9/1896 | Bracher | 156/88 |
| 3,076,252 | 2/1963 | Hofmann | 156/88 |
| 3,526,554 | 9/1970 | Obeda | 156/73.1 |
| 3,679,526 | 7/1972 | Horton | 156/580.1 |
| 3,874,963 | 4/1975 | Barger | 156/73.2 |
| 4,097,327 | 6/1978 | Calemard | 156/580.2 |
| 4,496,407 | 1/1985 | Lowery, Sr. et al. | 156/73.3 |

Primary Examiner—Michael Wityshyn
Attorney, Agent, or Firm—Ervin B. Steinberg; Philip J. Feig

[57] ABSTRACT

An ultrasonic seal and cut method and apparatus comprises an ultrasonic sealing and cutting station which includes a horn adapted to be resonant at an ultrasonic frequency and an oppositely disposed anvil having a sealing surface and a cutting surface. As sheet material is passed through the station, the sheet material is cut and sealed in a marginal area adjacent to the cut. A substantially thermoplastic thread, either monofilament or multifilament, is fed together with the sheet material through the station in a position to cause the thread to fuse with the material in the marginal area. The provision of the thread permits the ultrasonic seal and cut method to be used for sheet material having a relatively low thermoplastic fiber content or exhibiting an open mesh weave, or being made of natural fibers.

20 Claims, 10 Drawing Figures

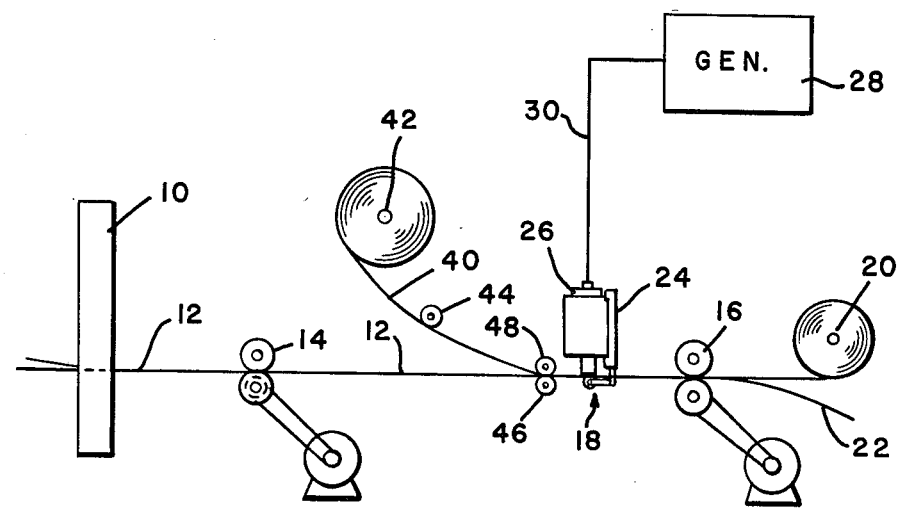
FIG. 1
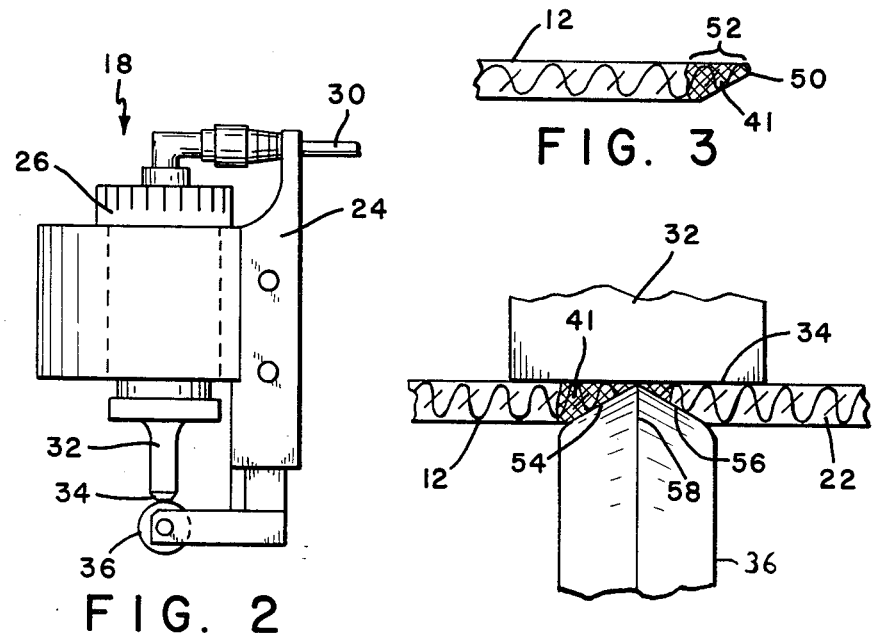
FIG. 2
FIG. 3
FIG. 4

ULTRASONIC SEAL AND CUT METHOD AND APPARATUS

BRIEF SUMMARY OF THE INVENTION

This invention refers to an ultrasonic seal and cut method and apparatus. More specifically, this invention relates to an ultrasonic seal and cut method and apparatus for textile sheet material which is fed in a continuous pass through a seal and cut station for providing simultaneously a cut and sealed edge to prevent unraveling of threads or the existence of a frayed edge.

The use of ultrasonic energy for simultaneously cutting and sealing the edge of plastic and textile material is well known in the prior art. The patents listed hereafter are illustrative of such prior art:

| Balamuth | U.S. Pat. No. 3,254,402 | June 7, 1966 |
| --- | --- | --- |
| Deans | U.S. Pat. No. 3,308,003 | March 7, 1967 |
| Sulzer | Swiss Pat. No. 439,158 | June 30, 1967 |
| Obeda | U.S. Pat. No. 3,378,429 | April 16, 1968 |
| Sager | U.S. Pat. No. 3,657,033 | April 18, 1972 |
| Reifenhauser | U.S. Pat. No. 3,681,176 | August 1, 1972 |
| Obeda | U.S. Pat. No. 3,697,357 | October 10, 1972 |
| Obeda | U.S. Pat. No. 3,737,361 | June 5, 1973 |
| Ries | German GM 7401580 | May 2, 1974 |
| Parry | U.S. Pat. No. 3,852,144 | December 3, 1974 |
| Calemard | U.S. Pat. No. 4,097,327 | June 27, 1978 |

The principal advantage of the ultrasonic seal and cut method is that the edge of the textile material while being cut simultaneously is sealed by the dissipation of ultrasonic energy, thereby preventing the presence of a frayed edge or the unraveling of threads.

In order to successfully apply the ultrasonic method to textile materials, it is necessary that the textile material contains a significant amount of thermoplastic fibers, typically 50 percent or more. The thermoplastic material, under the influence of ultrasonic energy, softens and flows and subsequently rigidifies when no longer subjected to ultrasonic energy, thus leaving a fused surface in a narrow marginal area adjacent to the cut.

As stated heretofore, the above described method is not used successfully when the thermoplastic fiber content falls below the required amount or when the sheet material is a relatively open weave. The present invention discloses the use of a thread, preferably substantially thermoplastic material, which is fed together with the sheet material through the ultrasonic seal and cut station to cause the thread to melt and become fused with the sheet material in the marginal area adjacent to the cut. In this manner, the sheet material, if a loose weave, is reinforced at the edge to thereby provide a significantly improved edge which is characterized by better wear and tear resistance, and in cases where the material contains less than the required content of thermoplastic fibers, the addition of the thermoplastic fiber thread increases the thermoplastic content at the edge to a degree that a sealed edge is provided.

As will be apparent from the description hereafter, the thread, being of substantially thermoplastic material, may either be a monofilament or a multifilament, and may be either of the same color as the sheet material or may be of a different color than the sheet material for providing, in the latter instance, a decorative appearance.

The advantage of adding a relatively thin thread resides in the fact that the thread flows into the interstices of the sheet material and thus does not add to the thickness of the base sheet material as is the case, for instance, in the Swiss patent supra, where a wide binding tape is used to cover the cut thread ends.

In addition, the present invention is particularly suited for providing a finished edge on non-woven sheet material where the fibers are randomly oriented, and on woven material made on shuttleless looms where a non-finished edge is obtained which must be trimmed and finished before the material is ready for sale.

A principal object of this invention, therefore, is the provision of an improved ultrasonic seal and cut method and apparatus for sheet material which is characterized by a relatively low thermoplastic content or comprises a relatively open weave.

Another important object of this invention is the provision of an ultrasonic seal and cut method and apparatus for sheet material wherein a thread is fused to the sheet material in a marginal area adjacent to the cut.

A further and important object of the present invention is the provision of an ultrasonic seal and cut apparatus for providing a sealed edge on sheet material to cause the edge to be enhanced in respect to resistance to wear and tear.

Further and still other objects of the present invention will become more clearly apparent by reference to the following description when taken in conjunction with the accompanying drawings.

BRIEF DESCRIPTION OF THE DRAWINGS

FIG. 1 is a schematic illustration of a typical ultrasonic seal and cut apparatus;

FIG. 2 is an elevational view of a typical ultrasonic seal and cut station;

FIG. 3 is a schematic illustration of textile material having an ultrasonically sealed marginal area adjacent to the cut in accordance with the present invention;

FIG. 4 is an illustration showing the sealing and cutting of textile material, which material is disposed between an ultrasonic horn and an anvil;

DETAILED DESCRIPTION OF THE INVENTION

Figure 5:
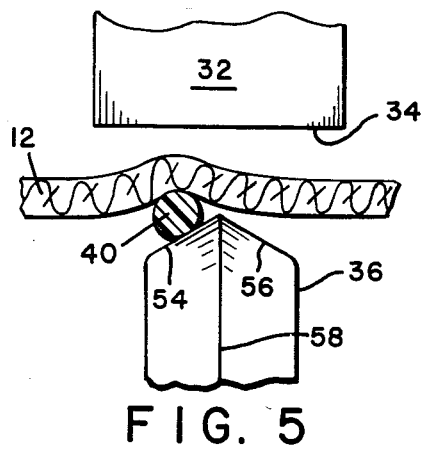
FIG. 5 is an illustration showing an arrangement of the textile material and the thread disposed between an ultrasonic horn and an anvil prior to sealing and cutting.

Referring now to the figures and FIG. 1 in particular, numeral 10 identifies the end of a weaving loom from which emerges a sheet 12 of textile material which is driven by means of suitable and well known drive mechanisms 14 and 16 in a continuous pass through an ultrasonic seal and cut station, generally identified by numeral 18. The sealed and cut sheet material is taken up on a storage roller 20 while the selvage 22 is discarded.

The ultrasonic seal and cut station comprises essentially a mount 24, see also FIG. 2, which supports an ultrasonic converter unit 26 which receives high frequency electrical energy from a generator 28 via an electrical conductor 30. The converter unit 26 contains piezoelectric transducer material for providing, in response to electrical high frequency input power, mechanical vibrations to a horn 32 dimensioned to be resonant along its longitudinal axis at a predetermined high frequency. The converter unit 26 and the horn 32 are designed to be resonant at an ultrasonic high frequency, typical operating frequencies being 20 kHz and 40 kHz, but any other frequency in the normal operating range between 16 and 100 kHz will be suitable.

The output surface 34 of the horn is opposed by an anvil wheel 36 which will be described in greater detail hereafter. The anvil wheel may be rotating or, as used in the present invention, is clamped against rotation by a centrally disposed screw, and is indexed to expose a new peripheral surface to the horn when the previously exposed surface portion has become dull or damaged. Either the anvil is spring mounted as shown in the Calemard patent supra, or the converter unit is spring biased against the anvil as shown in U.S. Pat. No. 3,734,805 issued to E. G. Obeda et al. entitled "Ultrasonic Sewing Machine" dated May 22, 1973. The seal and cut station comprising the support 24, converter unit 26, horn 32 and anvil 36 together with the electrical generator 28 is a commercial unit and available as an "On-Loom Ultrasonic Slitter" from Branson Sonic Power Company, Eagle Road, Danbury, Conn., 06810 and described in the Branson Data Sheet PW-36. A similar unit is shown also in the patents to Sulzer and Calemard, supra.

In the present invention a thread 40 which preferably is a thermoplastic thread, either a thermoplastic monofilament or a multifilament thread, is unwound from a roller 42 and fed via guide rollers 44, 46 and 48 together with the sheet material 12 to the ultrasonic seal and cut station 18 for becoming fused with the sheet material in the marginal area adjacent to the cut.

FIG. 3 shows the result of the present arrangement. Numeral 12 designates the sheet material, for instance an open weave or a sheet of randomly oriented fibers, which has been cut to produce an edge 50. The marginal area 52 adjacent to the cut is filled with thermoplastic material 41 from the thread 40 and the entire area 52 is fused as a result of the dissipation of ultrasonic energy provided by the horn 32. In response to the dissipation of ultrasonic energy, the thermoplastic fibers of the sheet material 12 together with the thermoplastic thread 40 added soften, flow under the influence of the pressure applied, and subsequently harden when leaving the seal and cut station to thereby form a fused mass. The fused marginal area is a relatively small region and provides a finished edge which is not subject to a frayed appearance or to unraveling of threads. This phenomenon has been described in detail in the U.S. Pat. No. 3,378,429 to Obeda supra.

FIG. 4 shows the constructional details of the horn and opposing anvil with sheet material interposed during the seal and cut process. The anvil 36 has two tapered sealing surfaces 54 and 56 and a centrally located raised cutting surface 58 in the form of a centrally located ridge. These anvil surfaces are opposed by the flat output surface 34 of the horn 32. As previously stated, the anvil and horn are urged toward one another by suitable bias means, such as spring pressure or a combination of spring and fluid pressure and, in addition, the frontal surface of the horn when rendered resonant undergoes motional excursion toward and away from the anvil, which motion is responsible for the cutting action and the dissipation of energy which reflects itself as heat in the sheet material 12, causing the softening and melting of thermoplastic material. As seen in FIG. 4, the sheet material engaged by the sealing surface 54 of the anvil 36 exhibits a large mass of molten material due to the addition of a thread 40, whereas the sheet material 12 in contact with the sealing surface 56 exhibits a smaller mass of molten material since only the thermoplastic fiber content of the sheet material assumes a molten state. The material 12 on sealing surface 56 is discarded as selvage 22.

As will be readily apparent, the present arrangement in which a thread of thermoplastic material is added is eminently suited for effecting a welded and sealed edge on textile material which contains only a small amount of thermoplastic fibers or when an open weave is to be sealed and cut since, in the latter case, the thermoplastic thread added at the sealing station will be pressed into the interstices of the sheet material, filling the spaces with thermoplastic material, therefore producing a strengthened marginal region adjacent to the cut. In addition, the present invention is suitable also for effecting a sealed and cut edge in sheet material made from natural fibers which are not subject to softening and melting under the influence of ultrasonic energy.

Figure 6:
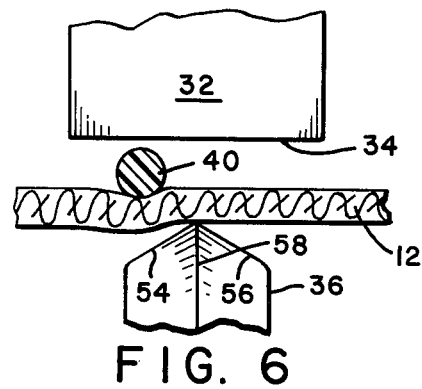
FIG. 6 is a view similar to FIG. 5, but showing an alternative arrangement.

FIG. 5 shows the ultrasonic horn 32 and opposing anvil 36 separated from each other prior to the ultrasonic sealing and cutting. The thread 40 is fed over the sealing surface 54 of the anvil 36 and is in contact with the sheet material 12. (As contrasted with FIG. 1, the roller 42 and guide roller 44 are disposed below the sheet material). In FIG. 6 the arrangement corresponds to the illustration per FIG. 1 wherein the thread 40 is disposed between the sheet material 12 and the output surface 34 of the horn 32. Responsive to the bias means (not shown) and the application of ultrasonic energy by the horn 32 the condition shown in FIG. 4 is caused with the end result of providing a sealed and cut edge of the sheet material as illustrated in FIG. 3.

Figure 7:
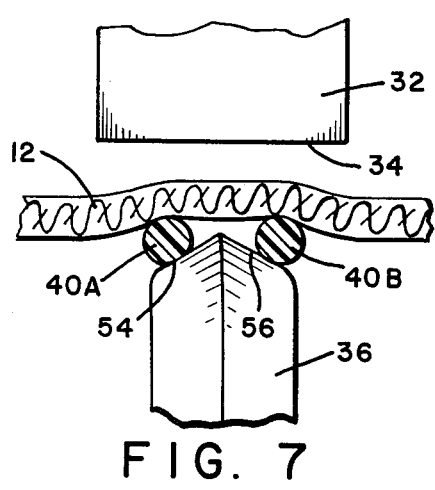
FIG. 7 is an illustration similar to FIG. 5 wherein two threads are used as may be needed in the case of an ultrasonic slitting apparatus.

FIG. 7 depicts a further modification, showing a pair of threads 40A and 40B being fed over the anvil 36, each thread being in contact with a respective sealing surface 54 and 56. In this manner either side of the cut edge 50, FIG. 3, will have a sealed marginal area 52 as may be required in a slitting apparatus where wider sheet material is slit into narrower ribbons and each ribbon edge has to exhibit a finished appearance.

Figure 10:
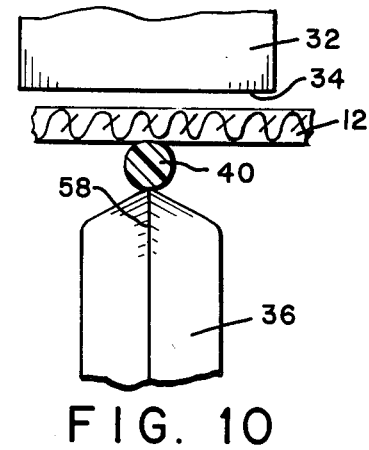
FIG. 10 depicts another alternative embodiment of the present method and apparatus.
Figure 8:
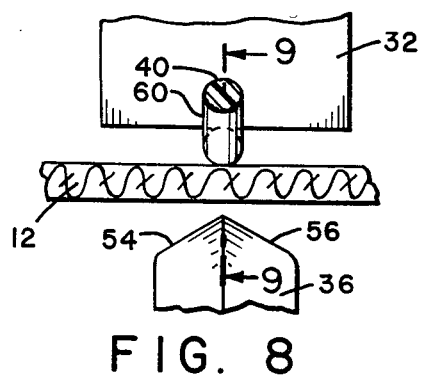
FIG. 8 depicts another embodiment wherein the thread is guided by a groove in the ultrasonic horn.
Figure 9:
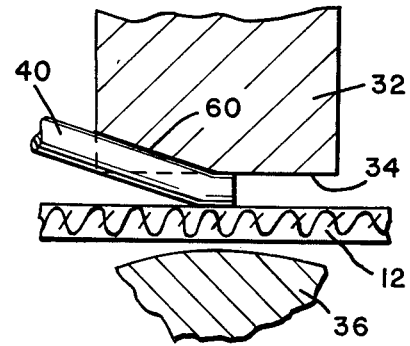
FIG. 9 is a view along line 9—9 in FIG. 8.

In FIG. 10 a thread 40 is fed over the centrally disposed cutting surface 58 of the anvil 36, thus providing substantially equal amounts of added thermoplastic material on either side of the cut edge as a result of the softened material being squeezed to either side. FIGS. 8 and 9 show a further modification wherein the thread 40 is fed through guide means 60 in the output surface of the horn 32 to the sealing and cutting surfaces. A guide means of this type in the form of a groove disposed in the underside of the horn is shown, for instance, in U.S. Pat. No. 3,526,554 issued to E. G. Obeda dated Sept. 1, 1970 and entitled "Method for Producing a Fillet Type Weld on Thermoplastic Material Using Ultrasonic Energy".

It should be noted that the thread added to the sheet material at the sealed region can be either of the same color as the sheet material or may be of a different color in order to provide for a decorative appearance. Moreover, the sheet material may be a single ply as shown or can be multiple plies which then become fused together at the cut edge and in the marginal region adjacent to the cut responsive to the dissipation of ultrasonic energy and the melting and fusing of thermoplastic material in the sheet material itself and as a result of the additional material provided by the thread.

In a typical example for providing a finished edge in sheet material in accordance with the present invention, the sheet material was a polyester fiber blend and the thread was a monofilament made of nylon material.

While there have been described and illustrated several preferred embodiments of the present invention and additional embodiments have been indicated, it will be apparent to those skilled in the art that various further changes and modifications may be made therein without departing from the spirit of the invention which shall be limited only by the scope of the appended claims.

What is claimed is:

1. The method of providing a finished edge on sheet material utilizing an ultrasonic seal and cut apparatus including the steps of:

providing an ultrasonic seal and cut station comprising an anvil and an opposing horn adapted to be resonant at an ultrasonic frequency;

passing sheet material through said station for causing material disposed between said anvil and said horn to be cut and simultaneously sealed in a marginal area adjacent said cut in response to said horn being resonant and in contact with the sheet material passing over said anvil;

feeding at least one thread adapted to melt responsive to the dissipation of ultrasonic energy provided by said horn simultaneously with the sheet material between said anvil and said horn in a position for causing said thread to melt and become fused with the sheet material in said marginal area, and removing the cut and sealed portion of the sheet material from the seal and cut station.

2. The method as set forth in claim 1, said thread being substantially thermoplastic material.

3. The method as set forth in claim 2, said thread being a monofilament thread.

4. The method as set forth in claim 2, said thread being a multifilament thread.

5. The method as set forth in claim 2, said thread being of the same color as the sheet material.

6. The method as set forth in claim 2, said thread being of a different color than the sheet material.

7. The method as set forth in claim 2, said thread being fed disposed between the sheet material and said anvil.

8. The method as set forth in claim 2, said thread being fed disposed between the sheet material and said horn.

9. The method as set forth in claim 2, said anvil having a cutting surface and an adjacent tapered sealing surface for providing sealing in the marginal area.

10. The method as set forth in claim 9, said thread being fed upon the tapered surface of said anvil.

11. The method as set forth in claim 9, said thread being fed upon the cutting surface of said anvil.

12. The method as set forth in claim 2, said thread being fed through guide means disposed in the horn.

13. The method as set forth in claim 2, said sheet material comprising woven or non-woven material and the thread when melted responsive to the coaction between the anvil and horn penetrating into the interstices of the sheet material.

14. The method as set forth in claim 2, and feeding a pair of threads simultaneously with the sheet material between said anvil and said horn.

15. An ultrasonic seal and cut apparatus for sheet material including a seal and cut station in the form of an anvil and an opposing horn adapted to be resonant at an ultrasonic frequency for providing ultrasonic energy to the sheet material fed over said anvil, the improvement comprising:

means for feeding sheet material through said station;

said anvil having a cutting surface and an adjacent sealing surface;

means for feeding a thread, adapted to melt responsive to the dissipation of ultrasonic energy provided by said horn, simultaneously with the sheet material between said anvil and said horn for being exposed to said sealing surface, whereby to cause said cutting surface to cut the sheet material responsive to said horn being resonant and in contact with the sheet material and said thread to melt and become fused with the sheet material in a marginal area adjacent the cut responsive to the exposure of said marginal area to said sealing surface.

16. An ultrasonic seal and cut apparatus as set forth in claim 15, said thread being fed disposed between said anvil and the sheet material.

17. An ultrasonic seal and cut apparatus as set forth in claim 15, said thread being fed disposed between said horn and the sheet material.

18. An ultrasonic seal and cut apparatus as set forth in claim 17, said horn including means at its output surface for guiding the thread.

19. An ultrasonic seal and cut apparatus as set forth in claim 15, said anvil having a pair of sealing surfaces and a centrally disposed cutting surface, and a pair of threads being fed in a position for causing a respective thread to be acted upon by a respective sealing surface.

20. An ultrasonic seal and cut apparatus as set forth in claim 15, said horn being resonant at a predetermined frequency in the range between 16 kHz and 100 kHz.

* * * * *